G. C. WEISS.
AMUSEMENT DEVICE.
APPLICATION FILED JUNE 16, 1920.
1,406,431.
Patented Feb. 14, 1922.
Witness.
Inventor.
Geo. C. Weiss

UNITED STATES PATENT OFFICE.

GEORGE C. WEISS, OF OAKLAND, CALIFORNIA.

AMUSEMENT DEVICE.

1,406,431.   Specification of Letters Patent.   Patented Feb. 14, 1922.

Application filed June 16, 1920. Serial No. 389,464.

*To all whom it may concern:*

Be it known that I, GEORGE C. WEISS, a citizen of the United States, and resident of Oakland, in the county of Alameda and State of California, have invented new and useful Improvements in Amusement Devices, of which the following is a specification.

The present invention relates to an amusement device and has reference more particularly to a playing surface consisting primarily of a board on which the alphabet and various other signs or indicating characters are written, and further including a pointer which, when the fingers of one or more persons are lightly rested thereon, will move without conscious volition or effort on their part and develop mediumistic messages by means of the pointer co-operating with the letters of the alphabet and other signs or indicating characters on the board.

As heretofore practiced, devices of this character have usually included a planchette or the like having a three point support on the surface with which it is adapted to co-operate and which when engaged by the fingers of the operator is adapted to move over the surface of the board and point out, or otherwise indicate, words and messages.

According to the present invention it is proposed to provide a pointer in lieu of the aforesaid planchette and to pivot the pointer intermediate its ends so that it may freely swing or move in either a clockwise or anti-clockwise direction and produce the same results sought to be accomplished by the planchette, but in a more effective manner.

The accompanying drawing illustrates the preferred form of reducing the invention to practice and the figure thereon represents a plan view of the device as contemplated by the invention.

Referring now to the drawing in detail, it is desired to produce a playing surface consisting of a suitable board or the like 5, and for the purpose of added attractiveness it is suggested that the board represent the shape of a horse shoe. Arranged around the edge of the board which represents the horse shoe are the indicating characters such as the letters of the alphabet, a series of numbers from one to ten and the words "Yes" or "No", as well as two sets of signs which may have a specific meaning. That part of the playing surface surrounded by the horse shoe may be filled in with any wording, figures, signs or other symbols and about the center thereof is pivoted the pointer 6. This pointer is of a length so that when swung or moved about its pivot the pointing end thereof may point to or touch upon any one of the letters of the alphabet or the series of figures, the words "Yes" or "No" or the two sets of signs. The opposite end of the pointer is produced with a relatively wide area, at least to the extent that the fingers of one or more operators may contact therewith in manipulating the device.

In operation should two persons desire to jointly use the device it is suggested that they assume confronting positions with the board supported between them and with their respective fingers resting lightly on the enlarged end of the pointer and on the opposite sides of a line extending longitudinally of the pointer. Either one of the participants may ask any question, and the theory advanced is that the pointer will move without conscious volition or effort on their part and will point out to them either through means of the signs, numbers, wording, or by spelling by means of letters of the adphabet, the answer to their question.

When a single participant uses the device he should support the board in front of him with his fingers resting lightly on the enlarged end of the pointer whereupon the same results will be accomplished as in the case of two participants.

An improved feature of the invention resides in the pivotal mounting of the pointer which permits the same to move over the surface to its various indicating positions with a minimum of friction.

I claim:

In a device of the character described, a flat smooth playing surface, comprising a board representing a horseshoe with indicating characters including letters of the alphabet, a series of numbers, words, and signs, arranged around the semicircular edge of the horseshoe; a thin flat pointer pivoted intermediate its ends concentric of the playing surface and having a pointing end with its opposite end embodying an enlarged flat surface adapted to be engaged by the fingers of one or more players in effecting a manipulation of the pointing end in co-operation with the indicating characters for the purpose described.

GEORGE C. WEISS.